Patented Aug. 26, 1941

2,253,560

UNITED STATES PATENT OFFICE 2,253,560

MANUFACTURE OF HALOGENATED PHTHALOCYANINES

Stanley Rawlings Detrick and Kenneth Carl Johnson, Wilmington, Del., assignors to E. I. du Pont de Nemours & Company, Wilmington, Del., a corporation of Delaware No Drawing. Application October 6, 1939, Serial No. 298,256

4 Claims. (Cl. 260—314)

This invention relates to coloring matters of the phthalocyanine series. More particularly, this invention deals with an improved process for the manufacture of halogenated metal phthalocyanines.

In practice of the art heretofore the manufacture of halogenated metal phthalocyanines was effected by two principal processes: (1) Synthesis of a phthalocyanine compound from halogenated intermediates; (2) Synthesis of a phthalocyanine compound from non-halogenated initial material, isolating the color and then subjecting the same to halogenation in special media, for instance nitrobenzene, molten phthalic anhydride or an aluminum-chloride-sodium-chloride melt.

For the production of highly-halogenated phthalocyanine, say over 14 halogen atoms per molecule, only the second mode of operation can be considered, inasmuch as the first mode is limited in applicability to the production at most of an octachloro-phthalocyanine. According to the practice heretofore, however, the second mode of procedure consisted of two independent operations: The synthesis of the phthalocyanine compound was effected in any desirable manner and the reaction mass had to be subjected to further treatment before it was ready for halogenation. For instance, where the color had been synthesized directly from phthalonitrile and a metal, without any diluents whatever, the reaction mass, being in the form of a large solid mass, had to be ground to a fine powder before treatment with halogen. On the other hand where a diluent such as sodium sulfate had been employed in the synthesis, the same had to be removed before halogenation, for instance by aqueous extraction, preceded by grinding to break up the solid mass. In the halogenation step again, any optional working medium was employed, and where an aluminum-chloride-sodium chloride melt was employed for this purpose, the subdivided pigment had to be fed cautiously into this melt to prevent foaming.

It is now an object of this invention to provide a unitary and simplified process of operation wherein the synthesis step and the halogenation step are interlinked with each other and made to cooperate with each other whereby to avoid superfluous operations and to increase the efficiency of the overall process. It is a particular object of this invention to provide a combination process for the manufacture of halogenated metal phthalocyanines whereby to avoid the step of intermediate isolation and grinding or purification of the color. Other and further important objects of this invention will appear as the description proceeds.

Briefly stated, our improved process consists of the following series of interlinking steps:

Phthalonitrile and a metalliferous reagent chosen to provide the desired metal, for instance copper bronze or a copper compound, are heated together with an alkali-metal halide, preferably sodium chloride, within the range of temperature generally employed in phthalocyanine synthesis, say 170 to 250° C. The reaction mass, which is solid at the end of the reaction, is allowed to cool and charged directly into the halogenation vessel without any special extraction treatments and without grinding except for a coarse crushing treatment, if desired, to break up any excessively large chunks to a readily handleable size. The halogenation vessel is charged simultaneously with a sufficient quantity of anhydrous aluminum chloride, in the solid state, to form with the alkali-metal halide content of the mass a low-melting flux.

A ratio of 4 parts by weight of aluminum chloride for each part of sodium chloride is ideal for this purpose, since this corresponds to the eutectic ratio of these two compounds and gives a mass of lowest melting point. Other ratios, however, may be conveniently employed, so long as the resulting mixture is molten at the preferred temperature of chlorination, which is about 200 to 230° C. In actual practice there would be little advantage in using more than 7 parts by weight of aluminum chloride, or less than 2.5 parts, per part of sodium chloride.

Halogenation catalysts may also be added at this stage, for instance cupric chloride, ferric chloride, antimony pentachloride. Where, however, the initial mass contained an excess of the metalliferous reagent and the latter in turn is one which is readily halogenable, for instance cuprous chloride, the positive addition of halogenation catalyst to the intermediate mass may be dispensed with, inasmuch as it will be formed in situ as the halogen is being introduced.

Next, the mass is heated until it is molten, and while being maintained at an elevated temperature, say 200 to 230° C., a halogenating agent, say chlorine or bromine, is fed in until the mass practically absorbs no more of the same.

When halogenation has thus been completed, the reaction mass is now introduced into a large volume of dilute aqueous acid, for instance 2 to 6% hydrochloric acid solution, to wash out the water-soluble constituents of the mass, such as aluminum chloride and sodium chloride. After filtering off the color, the latter may be subjected to further purification by acid pasting, that is, dissolving in sulfuric acid monohydrate or chlorosulfonic acid and then drowning in water to reprecipitate the color.

We find that the halogenated color produced by this procedure is of high quality, and that furthermore its yield is high, since the losses thereof through repeated handling are reduced to a minimum. The labor of the intermediate isolation and grinding steps are obviously saved by our procedure, and there is also a saving in material since the same sodium chloride is used as diluent or flux both in the synthesis and in the halogenation step. In the former procedures of the art, for instance, where sodium sulfate was used as a diluent in the synthesis step, this constituted a complete loss since it had to be removed completely prior to the addition of the diluent or flux in the halogenation step.

Without limiting our invention to any particular procedure, the following examples are given to illustrate our preferred mode of operation. Parts mentioned are by weight.

Example 1

*Step I.*—An intimate mixture of phthalonitrile (415 parts), sodium chloride (400 parts) and cuprous chloride (85 parts) was prepared by milling the components for several hours in a ball mill.

900 parts of this premix were heated to 190° C. in an enamel tray heated by an oil bath. After one hour the reaction was complete and the product was cooled and ground to 60 mesh. This crude reaction mass contained approximately 50% of copper phthalocyanine.

*Step II.*—Chlorination of the crude copper phthalocyanine from Step I was carried out in the following manner:

A mixture of the crude reaction mass from Step I (325 parts), aluminum chloride anhydrous (610 parts) and cupric chloride (27 parts) was charged into a reaction vessel equipped with agitator, chlorine inlet line, exit line for exhaust gases and temperature control which was heated until the inside temperature was approximately 200° C. At this point, the charge formed a smooth thin melt. Dry chlorine was passed into this melt at such a rate that it was substantially absorbed as fast as it was added. When the chlorine was no longer absorbed or when the chlorine content of the pigment reached 47% to 48%, the molten charge was run into a mixture of 37% hydrochloric acid (60 parts) and ice and water (3000 parts). During the drowning operation, the dilute acid was kept vigorously agitated. The suspension of color was then filtered and the filter cake washed acid-free and dried.

The dried crude chlorinated copper phthalocyanine above may now be put into condition for use in inks, paints, etc. by "acid-pasting" in the usual manner, that is by dissolving the pigment in sulfuric acid, oleum or chlor-sulfonic acid and drowning the solution in water. The resulting precipitate is then filtered off, washed acid-free and dried.

The pasted product is a very bright pure green pigment analyzing 48.5% chlorine which corresponds to approximately 15 chlorine atoms per molecule.

Example 2

A mixture of 325 parts of the crude reaction mass obtained in Step I of Example 1, with 610 parts of aluminum chloride and 54 parts of cupric chloride, was melted in a vessel at 200° C. and bromine was passed in, by bubbling nitrogen through bromine and then into the charge, over a period of several hours until a test sample drowned in dilute hydrochloric acid showed a bright green coloration. The charge was drowned in dilute acid, filtered, washed and dried. The dried product was then acid-pasted in sulfuric acid monohydrate giving a yield of 300 parts. This product contained 52.6% bromine, which corresponds to 8 bromine atoms per mol, and was a green somewhat bluer in shade than the highly chlorinated copper phthalocyanine.

Example 3

This example is similar to Example 1 except that the 27 parts of cupric chloride are replaced by 27 parts of anhydrous ferric chloride as catalyst for the chlorination.

The chlorination was carried out in a manner similar to that described in Example 1. The product, isolated in the manner described, was found to contain 47.0% by weight of chlorine. Its Fe content was only 0.05%.

Example 4

An intimate premix of phthalonitrile (150 parts), sodium chloride (150 parts) and cupric chloride (60 parts) was baked in an enamel tray at 220° C. for one hour until pigment formation was complete. The product, ground to 40 mesh, was mixed with aluminum chloride (610 parts) and the mass was melted together at 220° C. The chlorination was carried out as described in Example 1.

The purified product was a bright yellow green pigment containing 47.5% chlorine by weight.

This process may be modified by carrying out the first step in a reaction vessel such as described in U. S. P. 2,153,300. After pigment formation is complete, the aluminum chloride may be charged into the same reaction vessel. The entire mass may then be melted down and the chlorination may be carried out in the same reaction vessel, thereby eliminating the necessity of handling the crude intermediate pigment at all.

It will be understood that the above examples are merely illustrative and that the details of procedure may be varied within wide limits without departing from the spirit of this invention. Thus, The degree of halogenation in each example is somewhat arbitrary and products of higher or lower halogen content can be obtained by introducing chlorine or bromine until a test sample shows the desired halogen content. Likewise the temperature of halogenation may be varied outside the limits preferred in the above examples and may in fact be any temperature between the fusion point and boiling point of the melt employed.

In lieu of sodium chloride, in the above examples, potassium chloride or mixtures of the two may be employed. In the case of bromination, sodium or potassium bromide may be employed.

The proportion of cupric chloride as a preferred chlorination catalyst may vary within wide limits from the point of using no cupric chloride at all to the point of replacing all of the sodium chloride in the bake and subsequent melt. In other words, the cupric chloride may be employed to combine the functions of a diluent, a halogen carrier and of a flux for the aluminum chloride.

Although the above examples illustrate this invention with particular reference to halogenated copper-phthalocyanine, these processes are applicable also to the production of other halogenated metal-phthalocyanines, for instance those of iron, nickel, cobalt, aluminum, tin chromium and zinc. Of course, the cupriferous reagent in the first step must then be replaced by the corresponding metalliferous reagent. It may also be desirable to select a different halogenation catalyst, so as not to tend to contaminate the product with its own metal content. Of the catalysts which come into considerattion for the above purpose in addition to cupric chloride, and which are often interchangeable for the same purpose, may be mentioned ferrous chloride, ferric chloride, nickel chloride and antimony chloride. Other salts of the above metals, whether in the -ous or -ic states, which under the action of the halogenating agent would give the corresponding halide directly, may be employed; for instance, copper sulfate, copper acetate, cuprous chloride, cuprous or cupric bromides, cuprous or cupric oxide, nickel sulfide, nickel phosphate, nickel formate, nickel oxide or hydroxide, iron oxide, iron sulfate, ferric nitrate, or other iron salts. Compounds of metals other than those above mentioned may also be used, for instance salts of cobalt, manganese, chromium, vanadium, titanium, molybdenum and other halogen carriers. Antimony sulfide may also act as a catalyst.

We claim:

1. A process for producing a halogenated metal phthalocyanine which comprises reacting phthalonitrile with a metalliferous reagent in the presence of an alkali-metal halide as a diluent to produce a reaction mass consisting essentially of a metal-phthalocyanine and said diluent, then admixing the reactiton mass with anhydrous aluminum chloride and heating the resulting mixture to produce a fluid mass while subjecting it to the action of a halogenating agent, selected from the group consisting of chlorine and bromine.

2. A process for producing a halogenated metal phthalocyanine which comprises heating together a mixture of phthalonitrile, sodium chloride and the desired metalliferous reagent to form a mixture of the desired metal phthalocyanine and sodium chloride; then admixing the crude reaction mixture with a halogenation catalyst and a sufficient quantity of aluminum chloride to produce a low melting flux with the sodium chloride of the reaction mass; heating the resulting mixture to a temperature at which the flux is liquid, and passing into the fused mass a halogenating agent selected from the group consisting of chlorine and bromine.

3. A process for producing halogenated copper phthalocyanine, which comprises fusing together a mixture of phthalonitrile, sodium chloride and a cupriferous reagent to produce a mixture of copper-phthalocyanine and sodium chloride; then adding to this mixture cupric chloride and a sufficient quantity of anhydrous aluminum chloride to produce a low-melting flux with the sodium chloride; heating the resulting mixture until it becomes molten; treating the resulting mass with a halogenating agent from the group consisting of chlorine and bromine until the desired quantity of halogen has been absorbed by the copper-phthalocyanine, and finally treating the halogenated mass to separate it from the water-soluble constituents.

4. A process for producing chlorinated copper phthalocyanine, which comprises fusing together a mixture of substantially equal weights of phthalonitrile and sodium chloride, containing at least one mole of a cupriferous reagent per four moles of phthalonitrile, and maintaining the mass at elevated temperature until the formation of copper-phthalocyanine is substantially complete; then admixing the reaction mass with a quantity of anhydrous aluminum chloride equal in weight to about 2.5 to 7 times the weight of the sodium chloride, and containing further, if desired, a chlorination catalyst; heating the resulting mixture until molten and passing into it gaseous chlorine until substantially none longer is absorbed; and then treating the mass with dilute aqueous hydrochloric acid to recover the chlorinated copper-phthalocyanine free of water-soluble impurities.

STANLEY RAWLINGS DETRICK.
KENNETH CARL JOHNSON.